United States Patent Office 3,175,586
Patented Mar. 30, 1965

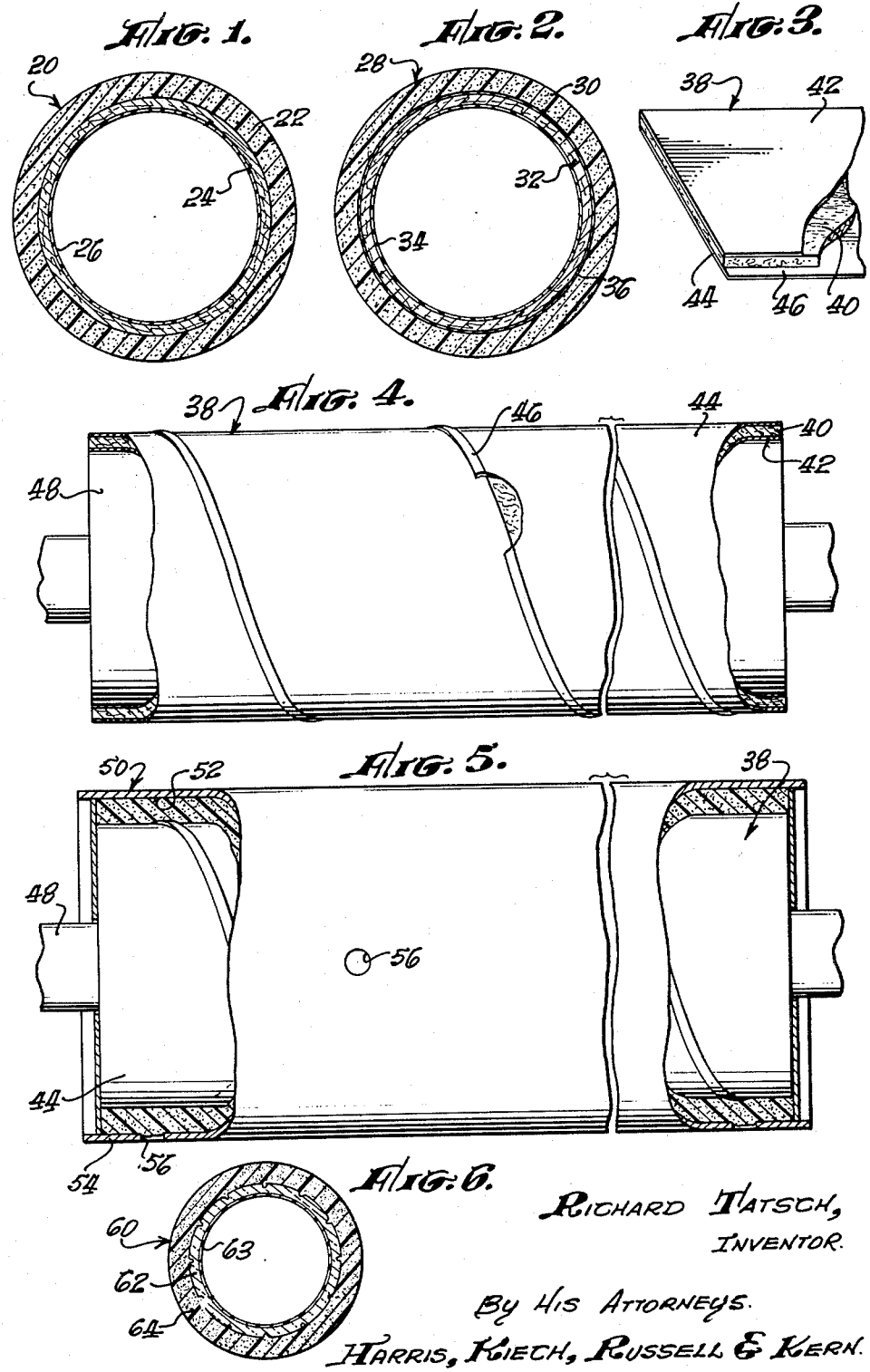

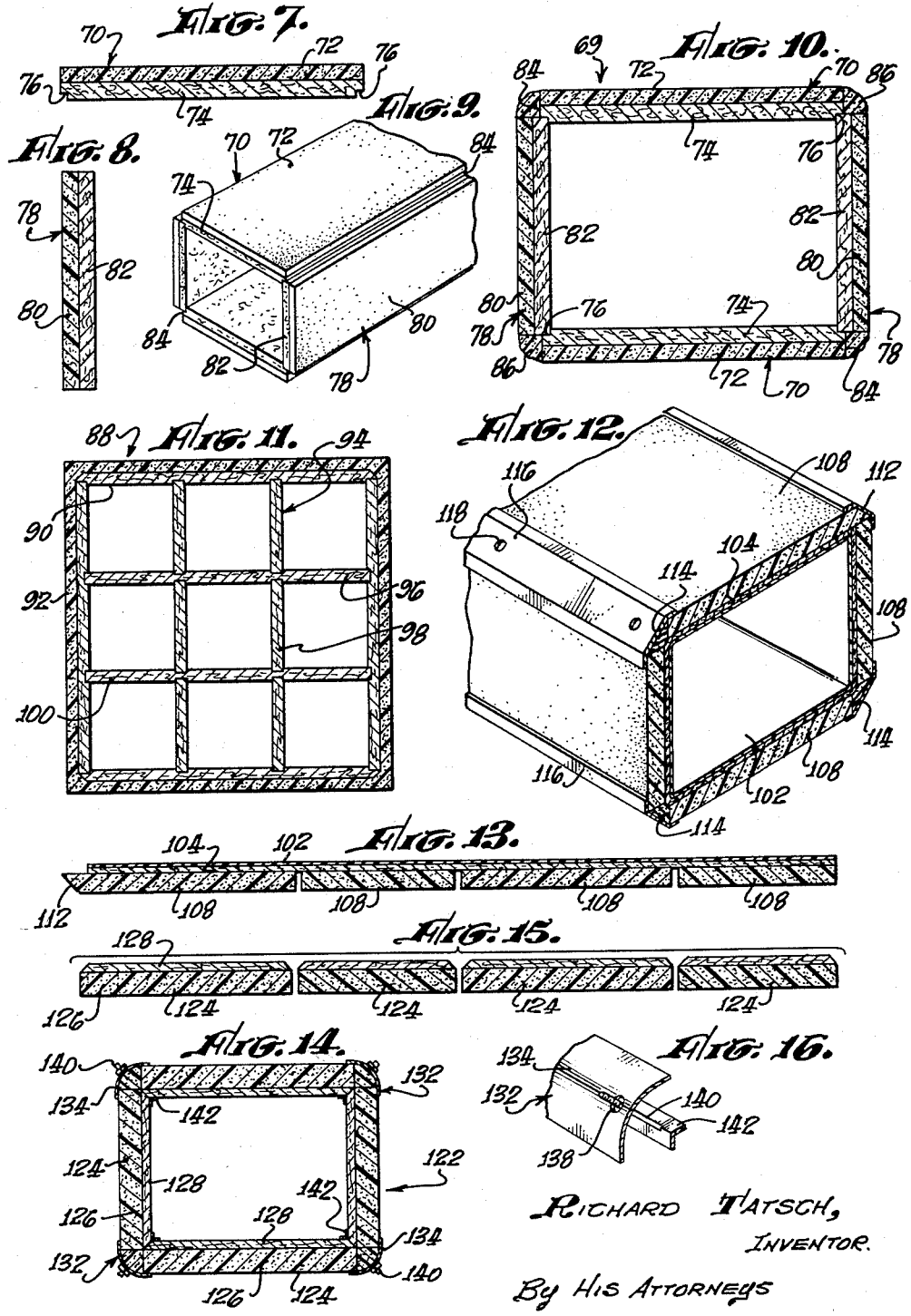

3,175,586
CONDUIT AND METHOD OF MANUFACTURE
Richard Tatsch, 1410 W. 6th St., Silver City, N. Mex.
Original application Aug. 15, 1960, Ser. No. 49,757.
Divided and this application Apr. 8, 1963, Ser.
No. 271,051
12 Claims. (Cl. 138—137)

This invention relates to an improved gas conduit of superior acoustical and insulating properties and to a method of manufacture. The instant patent application is a division of pending application Serial No. 49,757, filed August 15, 1960, now abandoned.

The requirements for a fully acceptable air conduit of the type employed in house and other constructions are many. The air conduit should have low thermal conductivity and be relatively moisture impermeable and preferably of a rigid structure. The material of construction used in an air conduit should be fire resistant and of adequate strength to avoid breakage. The conduit preferably possesses a high sound absorbing ability, especially at low frequencies, and freedom from attack by bacteria and algae. The conduit should have no odor and its material of construction preferably does not fray at higher air velocities.

Glass fiber in a flexible mat form has been used before in the construction of air conduits, sometimes with a thin flexible outer sheet of paper or a solid plastic material, usually a vinyl plastic, forming the outer surface of the conduit. This structure is exceedingly flexible and lacks rigidity.

The improved air or gas conduit of the invention utilizes glass fibers for their fire resistance and sound absorbing properties without loss of rigidity. Broadly speaking, the improved gas conduit of the invention includes an inner wall formed of glass fiber and an outer wall made up of a rigid, plastic foam material placed about the inner glass fiber wall and serving as a rigid backing therefor. The glass fiber inner wall effectively shields the outer, plastic foam wall from high internal temperatures when these occur. High temperatures are detrimental to the rigidity of the plastic foam materials and are to be avoided. The outer wall is preferably of a thicker construction than the inner wall. The use of the foam outer wall greatly enhances the insulating property of the gas conduit. Glass fiber has a tendency to absorb water; in contrast, the foam outer wall is relatively moisture impermeable. The improved gas conduit is characterized by a high sound absorption ability at low frequencies and has a sufficient strength to avoid breakage under normal usage. The improved structure is free from attack by bacteria or algae and has no objectionable odor. In a preferred embodiment of the improved structure, which is designed for use with high air velocities, the inner face of the inner glass fiber wall is lined with a thin, fire-resisting material which presents a smooth surface having a low coefficient of friction, such as, for example, a vinyl film or neoprene film.

Various methods are available for the manufacture of the gas conduit of the invention. In one preferred process, the inner wall of the conduit is shaped by wrapping a glass fiber mat about a mandrel. The glass fiber wrapped mandrel is then transferred to a mold where it is placed centrally therein. The location of the wrapped mandrel away from the walls of the mold provides a cavity about the glass fiber wrapped mandrel. A liquid foam plastic blend, preferably a polyurethane blend, is introduced to the mold cavity and permitted to expand, filling the cavity, thus providing a rigid plastic foam outer wall for the conduit. The polyurethane or other foam adheres to the outer wall of the glass fiber mat. In one embodiment, the glass fiber mat wrapped about the mandrel has bonded to one of its surfaces a foil, e.g., aluminum foil. Suitable adhesives for bonding the foil to the glass fiber mat include various epoxy and phenolic resins. In this latter embodiment the foil provides an interstructural skin to which the polyurethane or other foam may adhere. The incorporation of the interstructural skin in the conduit structure further increases its structural strength. An alternative method to the molding approach for the construction of the gas conduit of the invention involves the direct spraying of the liquid foam plastic blend on the glass fiber wrapped mandrel, preferably while the mandrel is being rotated at a uniform speed. The foam blend is applied to a uniform thickness, whereupon it will expand and become rigid.

A particularly desirable technique has been developed for use in conduit construction, and in particular provides an improved method for the closing or completion of an elongated joint comprising a groove formed by adjoining unattached surfaces. The joint is completed by forming a bead of rigid plastic foam material, preferably polyurethane, along the length of the groove. This bead serves as a weld to bond the adjoining surfaces together.

These and other advantages of the improved conduit structure and method of manufacture will become more apparent from the following specification and the accompanying drawings which are for the purpose of illustration only and in which:

FIG. 1 is a cross section of one embodiment of the gas conduit of the invention having an outer plastic foam wall and an inner, annular glass fiber wall with a vinyl coating on the inside face of the inner wall;

FIG. 2 is a cross section of another embodiment of the improved conduit, differing from the structure of FIG. 1 in having an interstructural foil skin between the two walls;

FIG. 3 is an isometric view of a segment of a glass fiber mat having a metal foil covering on one side and a vinyl coating on the other, used in the manufacture of the conduit of FIG. 2;

FIG. 4 illustrates a mandrel wrapped with the glass fiber mat of FIG. 3, as one step in the construction of the conduit of FIG. 2;

FIG. 5 shows the wrapped mandrel of FIG. 4 positioned in a mold with the plastic foam material of the outer wall of the conduit filling the cavity of the mold;

FIG. 6 is a cross section of still another modification of the improved gas conduit, differing principally from that illustrated in FIG. 1 in that the outer surface of the glass fiber wall has been kerfed;

FIGS. 7 and 8 are cross sections of two layer structural boards used in the construction of the conduit of FIGS. 9 and 10, with the board of FIG. 7 differing from that of FIG. 8 in having opposite edges of an underlying glass fiber layer grooved;

FIG. 9 is an isometric view of an incomplete conduit structure of the invention having a rectangular cross section;

FIG. 10 is a cross section of the conduit of FIG. 9 after the structural boards have been bonded together at their adjoining edges;

FIG. 11 is another modification of the conduit of the invention wherein the interior of the structure is provided wtih an open framework of longitudinally extending semirigid glass fiber members;

FIG. 12 is an isometric view of still another embodiment of the improved conduit wherein three of the conduit's corners are bonded with beads of foam plastic contained within corner cover plates;

FIG. 13 is a cross-sectional view of the wall of the structure of FIG. 12 in an intermediate stage of construction;

FIG. 14 is still another embodiment of the conduit employing a different type of corner retaining means;

FIG. 15 is an unassembled cross-sectional view of the wall members of the structure of FIG. 14; and FIG. 16 is an isometric, detailed view of the corner retaining means of the structure of FIG. 14.

FIG. 1 is a cross section through a typical multilayer air conduit of the invention and, as illustrated, a conduit 20 has an outer wall 22 made of a rigid, plastic synthetic resinous foam material placed about an inner glass fiber wall 24, both the inner and outer walls having an annular cross section. The rigid foam wall 22 serves as a backing for the relatively flexible glass fiber inner wall 24. The conduit 20 has the inner face of the inner glass fiber wall 24 lined with a thin, fire resisting sheet material 26 which presents a smooth surface having a low coefficient of friction to the flow of air through the conduit. The particular sheet material employed in the conduit 20 is a vinyl composition; however, other fire resisting materials having a smooth surface such as for example, neoprene or aluminum foil and the like may be utilized. Of the various available vinyl resins, the most suitable are polyvinyl acetate and polyvinyl chloride.

Various plastic foams of a rigid structure are available for the formation of the outer wall 22. A polyurethane type foam is the preferred construction material. Most of the important thermosetting and thermoplastic resins may be used to make plastic foams; for example, the various epoxies and phenolic resins. Various methods are employed to prepare foams from the different plastics. For example, the urethanes are foamed through the chemical reaction of isocyanate with water to liberate carbon oxide gas, with the carbon dioxide provided the foaming action needed to expand the material. Other available expanding media include refrigerant gases such as Dupont's Freon which is composed of chlorofluorinated hydrocarbons, or, General Chemical Division, Allied Chemical Corporation's Genetron 11, trichloromonofluoromethane. The use of these refrigerant gases results in a rigid foam with greatly improved insulating value, and they facilitate the mixing of the reactants by lowering the viscosity, which is especially important when the spray application method is used.

The vinyl chloride resins and polystyrene are generally foamed by incorporating a volatile material and heating. Many of the other plastics, including the epoxies, are foamed by heat-curing in the presence of a chemical blowing agent; that is a material which is stable at room temperature but which decomposes abruptly at an elevated temperature, providing a foaming gas such as carbon dioxide or nitrogen. Various foaming agents are available, including metals which react with acid and liberate hydrogen, nitrates or azo compounds which evolve nitrogen, sulfohydrazides, and diazonium salts. Of the various foam forming materials available, it has been found that the polyurethanes are the most satisfactory. Details as to the composition of the various liquid foam plastic blends and the methods of foaming will not be reviewed here as all of this information is known to the art and does not form a part of the instant invention. Various books of the Reinhold Plastics Applications series published by the Reinhold Publishing Company, New York, provide data and information on many of the plastic materials that may be used. Particular reference is made to the volume of the Plastic Applications series entitled "Polyurethanes," Bernard A. Dombrow, copyright 1957; "Epoxy Resins" by Irving Skeist and copyrighted 1958; and "Phenolic Resins" by David F. Gould, copyright 1959.

FIG. 2 is an illustration of a second embodiment 28 of the conduit of the invention, generally resembling the conduit of FIG. 1 in having an outer, annular, rigid, plastic foam wall 30 and an inner, annular, glass fiber wall 32. The inner face of the inner wall 32 is covered with a thin, vinyl sheet 34. The vinyl sheeting is not required where the conduit is used in an installation carrying a stream of low velocity air. The structure of FIG. 2 differs from that of FIG. 1 in having an interstructural wall 36 of aluminum foil placed between the outer, plastic foam wall 30 and the inner, glass fiber wall 32. The interstructural wall 36 imparts a higher structural strength to the multilayer conduit.

FIGS. 3, 4 and 5 illustrate steps in the manufacturing of the multilayer conduit of FIG. 2. The structure of FIG. 3 is a segment of a glass fiber mat 38 made up of an intermediate glass fiber layer 40 surfaced on one side with a vinyl resin sheeting 42 and on its other side with aluminum foil 44. The aluminum foil 44 provides an overlap 46 as illustrated along one side of the mat 38. With reference to FIG. 4, the glass fiber mat is fed onto a turning mandrel 48 in the fashion illustrated, with the overlap 46 serving to cover the adjoining edge of the glass fiber mat 38. The glass fiber wrapper mandrel 48 is then transferred to a mold 50 where the mandrel is placed centrally within the mold, thus defining an outer cavity 52 between the glass fiber wrapped mandrel and wall 54 of the mold. Wall 54 is provided with a number of holes 56 which serve a dual purpose in providing openings for the introduction of the liquid foam plastic blend and exhaust ports through which air and gases formed during the foaming may escape. The liquid urethane foam plastic blend or other plastic blend is supplied to the mold through the holes 56. The plastic blend expands, filling the cavity 52, thus providing a rigid plastic foam material which comprises the outer wall of the conduit. The foam material adheres to the aluminum foil 44 (the foil 44 thereby becoming the interstructural skin 36) and when the plastic has set, the mandrel may be removed from the mold and the finished conduit in turn removed from the mandrel. As an alternative to molding, a spray method of application of the urethane foam may be used wherein after the wrapper has been applied over the mandrel 48, the mandrel is rotated, preferably mechanically, and at a uniform speed, and a urethane spray gun is traversed longitudinally of the mandrel to apply one or more coatings of atomized foam blend to achieve the desired wall thickness, and when the plastic has foamed and set, the unit is removed from the mandrel. Rigid foam spray guns are commercially available in two general types with either internal or external mixing. The internal mixing type gun is preferred. The internal mixing type gun comprises two basic parts, a body and a nozzle. The body is used to convey the components in separate streams to the nozzle where the components are mixed by means of compressed air and some internal device to form a foaming mass. The foaming mass is then discharged through the nozzle with considerable velocity to form a finely atomized spray. Pumping and metering equipment for delivering the proper ratio of components to the spray gun is supplied. The details of foam spray guns and the manner of their use to form foaming masses are well known and need not be further discussed.

Conduit 60 of FIG. 6 is generally like that of FIG. 1, differing only in that the outer wall of the fiber glass layer 62 is kerfed to facilitate its shaping and to provide more surface and an irregular surface for the surrounding urethane wall 64 to adhere to. This conduit 60 is also preferably constructed with a vinyl sheeting 63 covering the inner wall of the fiber glass layer 62.

FIGS. 7, 8, 9 and 10 relate to a multilayer conduit 69 of rectangular cross section, with FIG. 9 illustrating an intermediate stage in the construction of the rectangular conduit. FIG. 7 is a cross section through a top or bottom panel 70 made up of a polyurethane or other foam layer 72 bonded to a flexible or semi-rigid glass fiber layer 74. The glass fiber layer 74 is provided with a notch or groove 76 running longitudinally of each of its side edges. FIG. 8 illustrates the cross section of a side panel 78 used in the construction of the rectangular conduit 69. The side panel 78 is made up of a polyurethane foam panel 80 bonded to a glass fiber semi-rigid or flexible mat 82. At an intermediate stage in the construction of the rectangular conduit 69, the side panels 78 and top and bottom panels 70 are assembled as shown in FIG. 9, providing a longitudinal groove 84 running the length of the conduit at each of its four corners. The notched-out glass fiber layers 74 of the top and bottom panels 70 engage the inner longitudinal edges of the side panels 78. This arrangement results in the aforementioned longitudinal grooves 84. A small amount of a liquid foam plastic blend, preferably a polyurethane blend, is sprayed along the length of the longitudinal groove 84. The liquid foam plastic blend expands and in so doing fills the groove, providing a bead weld 86 which bonds the adjoining surfaces of the panel members 70 and 78 together, thus completing the joint. The manner of bonding the panels together has proven highly satisfactory and, besides being convenient, results in a continuous structure which remarkably improves the strength of the conduit.

FIG. 11 is a cross section through still another modification of the multiple layer conduit of the invention. Conduit 88 of FIG. 11 has a general rectangular cross section with an inner glass fiber wall 90 surrounded by an outer rigid foam wall 92. The conduit 88 is especially suitable to the deadening of a high noise level and to this end there is provided an open framework 94 made up of longitudinally extending, semi-rigid glass fiber boards 96. The particular framework 94 illustrated comprises two perpendicular spaced members 98 crossed by two horizontally disposed spaced members 100.

The manner of constructing the conduit of FIG. 12 is best understood with reference to FIG. 13 where there is illustrated a continuous vinyl film sheeting 102 bonded to a continuous glass fiber mat 104. Foam wall panels 108 are separately formed and then bonded to the glass fiber mat 104. Three of the panel members 108 are of a regular configuration having square corners. One of the panel members 108 differs from the others in having a tapering longitudinal edge 112 along one of its sides. The rectangular conduit of FIG. 12 is conveniently formed by shaping the structure of FIG. 13 about a fixture not illustrated. With the placement of the structure about the fixture, there result three longitudinal grooves 114 along three corners of the partially completed conduit. The tapering edge 112 completes the fourth corner of the structure as illustrated. Elongated corner covers 116 are affixed to the three corners having the grooves, thus providing cavities of a triangular cross section into which the liquid foam plastic blend may be injected. Each of the three corner members 116 has several apertures 118 placed along its length. The apertures 118 permit the introduction of the plastic foam blend at spaced points along the grooves 114 and also provide exhaust ports through which the air may escape from the expanding foam. The corner members 116 limit somewhat the expansion of the foam, increasing its density.

Structure 122 of FIG. 14 is still another modification of the multiple layer conduit. As illustrated in FIG. 15, each of four wall panels 124 comprises a polyurethane or other foam layer 126 bonded to a glass fiber layer 128. Opposite longitudinal edges of the glass fiber layers 128 are beveled. The four panels 124 are placed about a fixture not illustrated with the glass fiber layers 128 disposed inwardly and held together by an elongated corner retaining means 132 placed at one or more corners of the structure 122. The corner retaining means 132 is made up of a curved elongated plate member 134 of substantially the same length as the panels 124. The plate member 134 has located along its length several apertures 138. In the assembled structure as illustrated in FIG. 14, the plate member 134 of the corner retaining means 132 is locked to the structure by one or more bolts 140 which extend between the curved plate member 134 and an elongated locking member 142 of L-shaped cross section positioned at the interior corner of the structure. The liquid foam plastic blend is introduced into the cavity formed by the curved plate member 134 of the corner retaining means 132 and the edges of adjoining panels 124. As in the structures of FIGS. 10 and 12, the liquid blend expands, filling each cavity to produce the rigid plastic foam material.

Although several exemplary embodiments of the invention have been disclosed herein for purposes of illustration, it will be understood that various changes, modifications, and substitutions may be incorporated therein without departing from the spirit of the invention, as defined by the claims which follow.

I claim:

1. An improved gas conduit having a rigid, fire resisting structure of desirable acoustical properties comprising: an inner wall formed of a mat of randomly distributed glass fibers; and an outer wall made of a rigid, fracturable, non-flexible and non-elastic plastic foam material placed about said inner glass fiber wall and serving as a rigid backing therefor.

2. A gas conduit in accordance with claim 1 wherein there is provided an interstructural skin formed of metal foil placed between the inner and outer walls.

3. A gas conduit in accordance with claim 1 wherein the structure is rectangular in cross section.

4. A gas conduit in accordance with claim 3 wherein the innerface of the inner glass fiber wall is covered with an aluminum foil skin.

5. An improved gas conduit having a rigid, fire resisting structure of desirable acoustical properties comprising: an inner, annular wall formed of a mat of randomly distributed glass fibers; and an outer, annular wall formed of a rigid, fracturable, non-flexible and non-elastic plastic foam material concentrically placed about said inner glass fiber wall and bonded thereto and serving as a rigid backing therefor.

6. A gas conduit in accordance with claim 5 wherein there is provided an interstructural skin formed of metal foil placed between the inner and outer walls.

7. An improved gas conduit having a rigid, fire resisting structure of desirable acoustical properties comprising: an inner wall formed of a mat of randomly distributed glass fibers; an outer wall made of a rigid, fracturable, non-flexible and non-elastic plastic foam placed about said inner glass fiber wall; and a thin, metal interstructural skin disposed between and bonded to the glass fiber inner wall and the plastic foam outer wall.

8. A gas conduit in accordance with claim 7 wherein the metal interstructural skin is aluminum foil.

9. A gas conduit in accordance with claim 7 wherein the inner face of the inner glass fiber wall is lined with a thin, fire resisting material presenting a smooth surface characterized by a low coefficient of friction.

10. An improved gas conduit having a rigid, fire resisting structure of desirable acoustical properties comprising: an inner wall formed of a mat of randomly distributed glass fibers; an outer wall made of a rigid, fracturable, non-flexible and non-elastic polyurethane foam placed about said inner glass fiber wall; and a thin metal interstructural skin disposed between and bonded to the glass fiber inner wall and the polyurethane foam outer wall.

11. A gas conduit in accordance with claim 10 wherein the interstructural skin is made of aluminum.

12. A gas conduit in accordance with claim 10 wherein the inner face of the inner glass fiber wall is lined with a thin, fire resisting material presenting a smooth surface characterized by a low coefficient of friction.

References Cited by the Examiner

UNITED STATES PATENTS

| | | | |
|---|---|---|---|
| 1,416,334 | 5/22 | Connery | 138—159 XR |
| 1,860,533 | 5/32 | Fredenhagen | 138—159 XR |

(Other references on following page)

UNITED STATES PATENTS

| | | |
|---|---|---|
| 1,916,908 | 7/33 | Stacey et al. |
| 2,047,778 | 7/36 | Hayden. |
| 2,333,026 | 10/43 | McDonough _____ 138—158 |
| 2,489,048 | 11/49 | Rinehart _____ 138—158 XR |
| 2,798,510 | 7/57 | Martin et al. |
| 2,873,226 | 2/59 | Davies et al. |
| 2,879,803 | 3/59 | Francois. |
| 2,906,317 | 9/59 | Keyes _____ 138—144 XR |
| 2,936,792 | 5/60 | MacCracken et al. _____ 138—131 |

FOREIGN PATENTS 866,949   5/61   Great Britain.

OTHER REFERENCES

Dombrow: "Polyurethanes," published by Reinhold Publishing Corp., 1957 (pages 68–69 relied on), copy in Group 160.

EDWARD V. BENHAM, *Primary Examiner.*

LEWIS J. LENNY, *Examiner.*